United States Patent
Brutscher et al.

(10) Patent No.: US 7,845,188 B2
(45) Date of Patent: Dec. 7, 2010

(54) SYSTEM FOR THE PREPARATION OF COMPRESSED AIR

(75) Inventors: Norbert Brutscher, Lindenberg (DE); Joachim Haas, Wangen (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 1041 days.

(21) Appl. No.: 11/071,546

(22) Filed: Mar. 2, 2005

(65) Prior Publication Data

US 2005/0235659 A1 Oct. 27, 2005

(30) Foreign Application Priority Data

Mar. 3, 2004 (DE) .................... 10 2004 010 366

(51) Int. Cl.
*F25D 9/00* (2006.01)
*B64D 33/02* (2006.01)
(52) U.S. Cl. .............................. 62/402; 62/86; 62/410; 244/53 R
(58) Field of Classification Search .................. 62/86, 62/402, 410; 244/53, 199, 208, 209, 210–212, 244/213–217, 12.6, 53 R, 199 R
See application file for complete search history.

(56) References Cited

U.S. PATENT DOCUMENTS

| | | | | |
|---|---|---|---|---|
| 4,378,920 A | * | 4/1983 | Runnels et al. | 244/135 R |
| 5,309,724 A | * | 5/1994 | Schreiber et al. | 62/87 |
| 5,511,385 A | * | 4/1996 | Drew et al. | 62/172 |
| 6,128,909 A | * | 10/2000 | Jonqueres | 62/87 |
| 6,250,097 B1 | * | 6/2001 | Lui et al. | 62/402 |
| 6,484,518 B1 | * | 11/2002 | Laugt | 62/87 |
| 6,491,739 B1 | * | 12/2002 | Crome et al. | 95/14 |
| 6,505,474 B2 | * | 1/2003 | Sauterleute et al. | 62/172 |
| 6,595,010 B2 | * | 7/2003 | Sauterleute et al. | 62/86 |
| 6,739,359 B2 | * | 5/2004 | Jones et al. | 141/64 |
| 6,845,630 B2 | * | 1/2005 | Bruno et al. | 62/323.3 |
| 6,913,636 B2 | * | 7/2005 | Defrancesco et al. | 95/8 |

(Continued)

FOREIGN PATENT DOCUMENTS

DE 4104007 8/1991

(Continued)

*Primary Examiner*—Ljiljana (Lil) V Ciric
(74) *Attorney, Agent, or Firm*—Dilworth & Barrese LLP (57) ABSTRACT

A method and a system for the preparation of compressed air having a heat exchanger (system heat exchanger) which is in communication with a pressure source on the inlet side on the compressed air side and which is in communication with a system or unit on the outlet side on the compressed air side which is to be supplied with cooled compressed air and including at least one heat exchanger (air conditioning system heat exchanger) which is in communication with a pressure source on the inlet side on the compressed air side and which is in communication with additional components of an aircraft air conditioning system on the outlet side on the compressed air side. Provision is made for the system heat exchanger and the at least one air conditioning system heat exchanger to have a common inlet for supply with ram air or environmental air and for the system heat exchanger to be connected on its outlet side on the compressed air side via a closable line to the line system on the compressed air side in communication with the at least one air conditioning system heat exchanger or to the at least one air conditioning system heat exchanger itself.

26 Claims, 10 Drawing Sheets

U.S. PATENT DOCUMENTS

| | | | |
|---|---|---|---|
| 6,942,183 B2 * | 9/2005 | Zywiak | 244/118.5 |
| 6,997,013 B2 * | 2/2006 | Jones | 62/655 |
| 7,048,231 B2 * | 5/2006 | Jones | 244/135 R |
| 7,081,153 B2 * | 7/2006 | Leigh et al. | 95/14 |
| 2003/0084681 A1 * | 5/2003 | Haas | 62/402 |
| 2004/0025507 A1 * | 2/2004 | Leigh et al. | 60/608 |

FOREIGN PATENT DOCUMENTS

| | | |
|---|---|---|
| EP | 1273514 | 1/2003 |
| EP | 2003240375 | 8/2003 |
| EP | 1375349 | 1/2004 |

* cited by examiner

SYSTEM FOR THE PREPARATION OF COMPRESSED AIR

BACKGROUND OF THE INVENTION

The invention relates to a system for the preparation of compressed air having a heat exchanger (system heat exchanger) which is in communication with a pressure source on the inlet side on the compressed air side and which is in communication with a system or unit on the outlet side on the compressed air side which is to be supplied with cooled compressed air and comprising at least one heat exchanger (air conditioning system heat exchanger) which is in communication with a pressure source on the inlet side on the compressed air side and which is in communication with further components of an aircraft air conditioning system on the outlet side on the compressed air side.

In a preferred aspect, the invention relates to an architecture for the preparation of compressed air which is required for the operation (supply) of oxygen and nitrogen generating units in aircraft.

With passenger aircraft, it is necessary to control the temperature of the cabin (cool/heat) and to ventilate and pressurize it. Different systems are required for this such as:

a) Air Conditioning Plants

The air coming from the compressed air bleed system is cooled in the air conditioning system in accordance with the arising cooling and heating demands in order to ensure a constant temperature in the cabin. In addition, the required fresh air throughput to ventilate the cabin is ensured.

b) Cabin Pressure Control System

This system regulates the cabin pressure in that more or less cabin air flows back to the environment by means of a variable valve position.

The failure of one of these systems or a high leakage of the cabin results in a drop in cabin pressure. Furthermore, heavy smoke development in the cabin can occur due to different malfunctions. In all these cases, an emergency oxygen supply is required for the passengers and the aircraft crew.

It is known to ensure the emergency oxygen supply by an emergency oxygen system. For this purpose, oxygen flasks under pressure are carried along in the aircraft which dispense oxygen to the passengers and to the aircraft crew by means of masks in an emergency. This emergency oxygen system is, however, associated with various disadvantages such as weight, limited oxygen quantity, space requirements, risk of explosion and time-consuming and expensive inspection and refilling.

In the meantime, alternative systems are available for the emergency supply of oxygen. It is known, for example, from DE 41 04 007 A1 and EP 1 375 349 A1 to press cooled compressed air through one or more molecular sieve concentration apparatuses (OBOGS=on board oxygen generating system). A fresh air/product gas having an oxygen content of up to approximately 95% thereby results at the OBOGS outlet. In a case of emergency, this air is then directed directly to the oxygen masks and/or for the refilling of the now considerably reduced oxygen flasks.

There are different OBOGS molecular sieve filler materials in this process. It is, however, common to all these materials that the molecular sieve apparatuses have to be supplied with cooled compressed air from approximately 0° C. to 60° C. and a relative pressure from approximately 1.4 bar (rel) to 4.0 bar (rel). In accordance with the prior art, the OBOGS supply takes place in that hot compressed air (approx. 200° C.) is directed from the compressed air bleed system into a special OBOGS heat exchanger. In this process, the air is cooled to the required temperature range of approximately 0° C. to 60° C., as can be seen from FIG. 1.

The OBOGS is very rarely in operation since the probability of a failure of the cabin pressurization is very low due to the integrated redundancies.

In addition to the aforesaid system for the emergency oxygen supply, a system is known for the generating of nitrogen which will be described in more detail in the following:

The aircraft tanks are filled with a mixture of kerosene and air due to the removal of kerosene during the flight. On an unfavorable composition, an explosive mixture can arise which ignites itself or due to spark formation.

Studies have shown that a spontaneous ignition of the mixture can be reliably avoided by a reduction in the (normal) oxygen content of the air in the kerosene tank from 21% to approximately 12% to 14.5%. In addition to a low oxygen content, a high nitrogen content is advantageous to prevent spontaneous ignition.

A unit is described in EP 1 375 349 A1 for the generating of nitrogen which is termed an OBIGGS (on board inert gas generating system). In a comparable manner to the OBOGS, this OBIGGS is also based on molecular sieve technology, with here, however, oxygen being filtered. A product gas having a much reduced oxygen content (less than approximately 10%) and a substantially increased nitrogen content arises at the outlet of the OBIGGS. This product gas can now be directed into the kerosene tank to avoid the risk of a spontaneous ignition of the kerosene/air mixture. The OBIGGS product gas can furthermore e.g. also be directed into freight spaces to minimize the fire hazard.

Analog to the OBOGS, the OBIGGS requires a supply with cooled compressed air from approximately 50° C. to 90° C. Depending on the filter technology used, the required supply pressure amounts to approximately 1.7 bar (rel) to 6.0 bar (rel) for PSA (=pressure swing absorption process) filters and to approximately 1.4 bar (rel) to 4.1 bar (rel) for HFM (=hollow fiber membrane) filters. In accordance with the prior art, the OBIGGS supply takes place as with the OBOGS in that hot compressed air (approximately 200° C.) is directed from the compressed air bleed system into a special OBOGS/OBIGGS heat exchanger and is cooled there in accordance with the demands.

Figure 1:
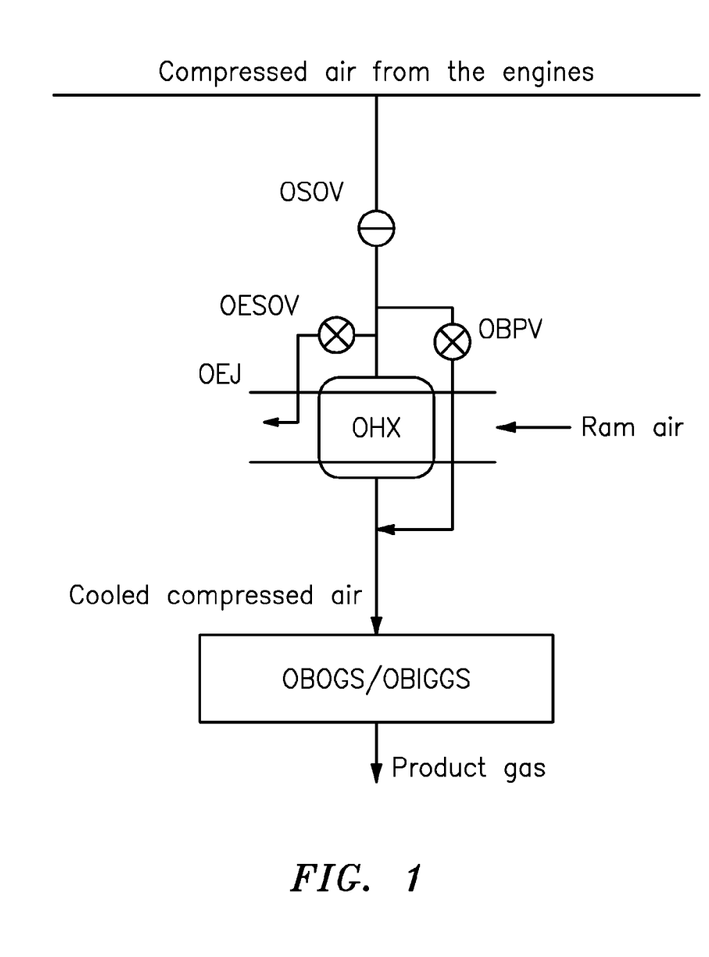
FIG. 1: OBOGS/OBIGGS heat exchanger to cool the compressed air.

Such a system is shown in FIG. 1. FIG. 1 shows that the heat exchanger OHX, which is in communication with the OBIGGS/OBOGS and which is termed a system heat exchanger in the following, is charged with compressed air (bled air) from the engines on the inlet side. The inlet line can be closed by means of the valve OSOV. A control valve OBPV is furthermore shown by means of which a bypass line around the system heat exchanger OHX can be closed. The reference symbols OESOV and OEJ are components of a jet pump which is required to convey ambient air through the system heat exchanger OHX in ground operation.

As can further be seen from FIG. 1, the system heat exchanger OHX is cooled by means of ram air or by means of ambient air in ground operation.

The cooled compressed air is available on the compressed air side of the outlet side of the system heat exchanger and is then supplied to the OBIGGS/OBOGS. The desired product gas can be removed or supplied to the destinations in question on the outlet side of said OBIGGS/OBOGS.

A high demand on the availability of the compressed air supply can also have the result that the architecture shown in FIG. 1 is present in duplicate in a parallel arrangement.

In contrast to the OBOGS, the OBIGGS is predominantly in operation.

The embodiment for the cooling of compressed air described above is associated with various disadvantages:

a) An independent ram air passage, including the corresponding openings for inlet and outlet in the aircraft structure, is required for the ram air of the system heat exchanger OHX. The available space for freight is thereby reduced and the aircraft weight is increased and additional costs are generated.
b) For reasons of cost and complexity, a flap at the outlet of the ram air passage is generally dispensed with. There is thus always a ram air passage throughput during flight, even if the OBOGS and/or OBIGGS is switched off. The ram air throughput increases the aircraft kerosene consumption and thus the operating costs.
c) OBOGS and/or OBIGGS operation can also be necessary on the ground, in particular for military applications. Since no ram air is available in this operating state due to the lack of ram pressure, it must be actively conveyed. For this purpose, either a fan or a jet pump as shown in FIG. 1 (OEJ and OESOV) must be installed. Both versions are associated with disadvantages of cost and weight.

SUMMARY OF THE INVENTION

It is therefore the object of the invention to provide a system for the cooling of compressed air for the supply of an OBOGS and/or OBIGGS or of units with similar compressed air requirements having a low weight which takes up little space and is cost favorable.

This object is solved by a system for the preparation of compressed air or method having the features herein.

In accordance with the invention, provision is made for the system heat exchanger and the at least one air conditioning system heat exchanger to have a common inlet for the supply with ram air or environmental air and for the system heat exchanger to be connected on its outlet side on the compressed air side via a closable line to the line system on the compressed air side in communication with the at least one air conditioning system heat exchanger or to the at least one air conditioning system heat exchanger itself.

The system heat exchanger is integrated into the ram air passage of the air conditioning system which is anyway present. Ram air or environmental air from the joint ram air passage of the air conditioning system heat exchanger(s) and of the system heat exchanger is used to cool the system heat exchanger.

Provision can generally be made for one system heat exchanger or for more system heat exchangers to be arranged in the ram air passage.

The following advantages result from such an architecture:

a) Weight and space savings due to the omission of the separate OBOGS/OBIGGS ram air passage and its inlets and outlets. The effect on the size of the ram air passage of the aircraft air conditioning system due to the added system heat exchanger OHX is small, since the ram air requirement for the system heat exchanger OHX is relatively small. The weight effect of the OHX remains neutral, that is it is independent of whether it is installed in a separate ram air passage or in a common ram air passage together with the heat exchangers of the air conditioning system.
b) If the aircraft air conditioning system has a fan, a ram air throughput for the system heat exchanger OHX can also be generated on the ground. A separate jet pump or a separate fan for the system heat exchanger OHX is not necessary.
c) With a suitable arrangement of the system heat exchanger OHX in the ram air passage of the air conditioning system, the OHX ram air is not directed uselessly through the ram air passage, but is used in the heat exchangers of the air conditioning system, as will be explained in detail with reference to FIG. 4 and FIG. 5.

The integration of the system heat exchanger OHX in the ram air passage, which is anyway present, already results in a significant improvement of the weight and construction space requirements with respect to the prior art. Two disadvantages, however, remain:

a) If the units OBOGS/OBIGGS are not required (switched-off state), the system heat exchanger OHX is so-to-say carried along uselessly. The available capacity for heat transfer is not used.
b) With a parallel OHX arrangement, as will be explained with reference to FIG. 3, and with a switched off OBOGS/OBIGGS, a useless ram air throughput takes place through the system heat exchanger OHX. In particular in ground operation, the disadvantage consists of the fact that the fan conveys ram air/environmental air uselessly through the system heat exchanger OHX and this ram air does not flow through the ram air heat exchanger of the air conditioning system (air conditioning system heat exchanger). The maximum possible cooling capacity of the air conditioning system is thereby reduced.

These disadvantages can be avoided by the connection in accordance with the invention by means of a closable line between the outlet of the OHX on the compressed air side and the line system of the air conditioning system on the compressed air side in communication with the at least one air conditioning system heat exchanger or with the at least one air conditioning system heat exchanger itself. When the systems OBOGS/OBIGGS are switched off, the cooling capacity of the system heat exchanger OHX can be utilized for the air conditioning system. If the system heat exchanger OHX is also available for the air conditioning system in the case of maximum cooling, the ram air heat exchanger(s) of the air conditioning system (air conditioning system heat exchangers) can be reduced due to the additional heat transfer capacity, which is accompanied by corresponding advantages with respect to weight and construction space.

Further preferred aspects of the invention are the subject herein.

The system heat exchanger OHX can be connected on its outlet side on the compressed air side via the closable line to the inlet or outlet side on the compressed air side of the at least one air conditioning system heat exchanger. It is preferred for the connection of the outlet side on the compressed air side of the system heat exchanger OHX at the outlet on the compressed air side of the heat exchanger of the air conditioning unit preferably to take place at the outlet on the compressed air side of the first heat exchanger of the air conditioning system on the compressed air side.

Generally, a connection of the outlet side of the system heat exchanger OHX on the compressed air side to the compressed air system of the air conditioning systems is also possible at another position, for example at the inlet side of the at least one air conditioning system heat exchanger on the compressed air side or to the air conditioning system heat exchanger itself.

The closable line can have an open/close valve or a valve by means of which different throughputs through the line can be set.

Provision is made in a further aspect of the invention for the closable line to extend between the outlet of the system heat exchanger OHX on the compressed air side and the outlet of the at least one air conditioning system heat exchanger on the compressed air side and for a line to branch off from this line upstream of a valve by means of which the line can be closed, said line leading to the system or unit which is to be supplied with cooled compressed air. If the system or unit does not require compressed air, this line can be closed.

In a particularly preferred aspect of the invention, a first air conditioning system heat exchanger on the compressed air side and a second air conditioning system heat exchanger downstream of it on the compressed air side are provided, with the system heat exchanger OHX being connected on its outlet side on the compressed air side via the closable line to the inlet or preferably outlet on the compressed air side of the first air conditioning system heat exchanger on the compressed air side and the preferably second air conditioning system heat exchanger on the ram air side.

Provision can be made in this process for the closable line to extend between the outlet of the system heat exchanger OHX on the compressed air side and the outlet of the first air conditioning system heat exchanger on the compressed air side and for a line to branch off from this line upstream of a valve by means of which the line can be closed, said line leading to the system or unit which is to be supplied with cooled compressed air.

The system heat exchanger OHX can be arranged differently relative to the air conditioning system heat exchanger(s) on the ram air side.

It is feasible for the system heat exchanger OHX to be connected in parallel to the air conditioning system heat exchangers on the ram air side and thus for ram air or environmental air of the lowest possible temperature to flow to it.

In a further aspect of the invention, it is provided that the system heat exchanger OHX is arranged on the ram air side before or after the first air conditioning system heat exchanger on the ram air side. If the system heat exchanger OHX and the air conditioning system heat exchanger(s) are connected in series on the ram air side, provision can be made for it/them to cover one another completely or only partly, that is for a complete or partial series connection to be achieved.

In a further aspect of the invention, two or more air conditioning system heat exchangers are provided which are arranged sequentially on the ram air side. Here, the system heat exchanger OHX can be arranged on the ram air side after the first air conditioning system heat exchanger on the ram air side and parallel to a further air conditioning system heat exchanger on the ram air side, preferably to the primary heat exchanger, i.e. to the first heat exchanger of the air conditioning system on the compressed air side.

In a further aspect of the invention, a ram air inlet flap is provided at the ram air passage inlet which, in its closed position, does not close the infeed of the system heat exchanger OHX on the ram air side. For this purpose, a partition wall is provided which has the effect that the ram air supply for the system heat exchanger OHX and for the air conditioning system heat exchanger(s) arranged parallel thereto on the ram air side takes place separately. In the closed state, the adjustable ram air inlet flap only closes the infeed of the air conditioning system heat exchanger(s) on the ram air side. It can thereby be avoided that too low a ram air throughput is achieved in heating operation (with a closed ram air inlet flap) which can result in a failure of the fan, as this will be explained with reference to FIG. 7.

The inlet line of the system heat exchanger OHX on the compressed air side and its outlet line on the compressed air side, which leads to the system or unit to be supplied with the cooled compressed air, can be in communication with one another by means of a closable bypass line. The temperature in the system or unit in question can be controlled by opening the bypass line.

In a further aspect of the invention, provision is made for the compressed air supply leading to the inlet of the system heat exchanger OHX on the compressed air side and for the compressed air supply leading to the inlet of the air conditioning system heat exchanger(s) on the compressed air side to branch off from a common compressed air line from the compressed air bleed system. The compressed air in the compressed air bleed system is made available, for example, from the engines or from an auxiliary unit. Any desired compressed air source, for example, a compressor, can be considered.

The term "compressed air bleed system" is thus not restricted to a system in which compressed air is taken up from the engines or from an auxiliary unit.

Provision can furthermore be made for the inlet of the system heat exchanger OHX on the compressed air side to be connected to the compressed air supply via a valve. The valve can be an open/close valve or a valve by means of which a specific throughput can be set.

The valve can be connected parallel to the inlet valve of the aircraft air conditioning system.

Provision can furthermore be made for the inlet of the system heat exchanger OHX on the compressed air side to be connected to the outlet of the inlet valve of the aircraft air conditioning system via a line. In this case, the system heat exchanger OHX is supplied with compressed air via the inlet valve of the aircraft air conditioning system.

As recited above in detail, the system or unit with which the system heat exchanger OHX is in communication at the outlet side on the compressed air side and which is to be supplied with cooled compressed air is an emergency oxygen supply system (OBOGS) and/or a nitrogen generating system (OBIGGS).

The present invention furthermore relates to a method having the features of claim 19. Accordingly, provision is made in a first operating mode for the compressed air to be supplied after cooling in the system heat exchanger OHX to that system or unit with which the system heat exchanger OHX is in communication and which is to be supplied with cooled compressed air and for the compressed air, in a second operating mode, after the cooling in the system heat exchanger OHX to be supplied to the line system of the air conditioning system on the compressed air side in communication with the at least one air conditioning system heat exchanger or to the at least one air conditioning system heat exchanger itself.

In the second operating mode, the cooling capacity of the system heat exchanger OHX can be utilized to support the cooling capacity of the air conditioning system heat exchangers.

Advantageous aspects of the method are the subject matter herein.

It is particularly advantageous for the compressed air in the second operating mode to be supplied after the cooling in the system heat exchanger OHX to the inlet or outlet of the at least one air conditioning system heat exchanger on the compressed air side, preferably to the outlet of the first air conditioning system heat exchanger on the compressed air side.

Provision can furthermore be made for the system heat exchanger OHX and the at least one air conditioning system heat exchanger to be supplied via common compressed air line from the compressed air bleed system.

In certain flight phases with a relatively low pressure level of the supply air and a high fresh air requirement, a partial or complete bypass of the turbine of the aircraft air conditioning system can be necessary. Considerably cooler air can be mixed into the bypass with respect to conventional operation when the second operating mode is set if the compressed air is to be guided partially or completely in bypass around the turbine.

A valve can be provided in the inlet side of the system heat exchanger OHX on the compressed air side. For the case that this valve is faulty and remains in the closed position, provision is made for the system heat exchanger OHX to be charged with compressed air which is taken upstream or downstream of the least one air conditioning system heat exchanger or from the air conditioning system heat exchanger itself. The failure of the said valve thus does not result in a total failure of the systems to be supplied by the system heat exchanger OHX.

Provision can furthermore be made for the system heat exchanger OHX and the at least one air conditioning system heat exchanger to be charged through a common inlet, but by means of a separate supply, with ram air or environmental air and for a ram air inlet flap to be provided which, in its closed position, only closes the infeed of the air conditioning system heat exchanger on the ram air side, with the ram air inlet flap being closed in heating operation so that the ram air or environmental air only flows through the system heat exchanger in heating operation. It can thus be ensured that ram air or environmental air also flows through the ram air passage with a completely closed ram air passage flap.

BRIEF DESCRIPTION OF THE DRAWINGS

Further details and advantages of the invention will be explained in more detail with reference to an embodiment shown in the drawing. There are shown.

DESCRIPTION OF THE PREFERRED EMBODIMENTS

Parts which are the same or which correspond in their function are provided with the same reference symbols in the Figures.

Figure 2:
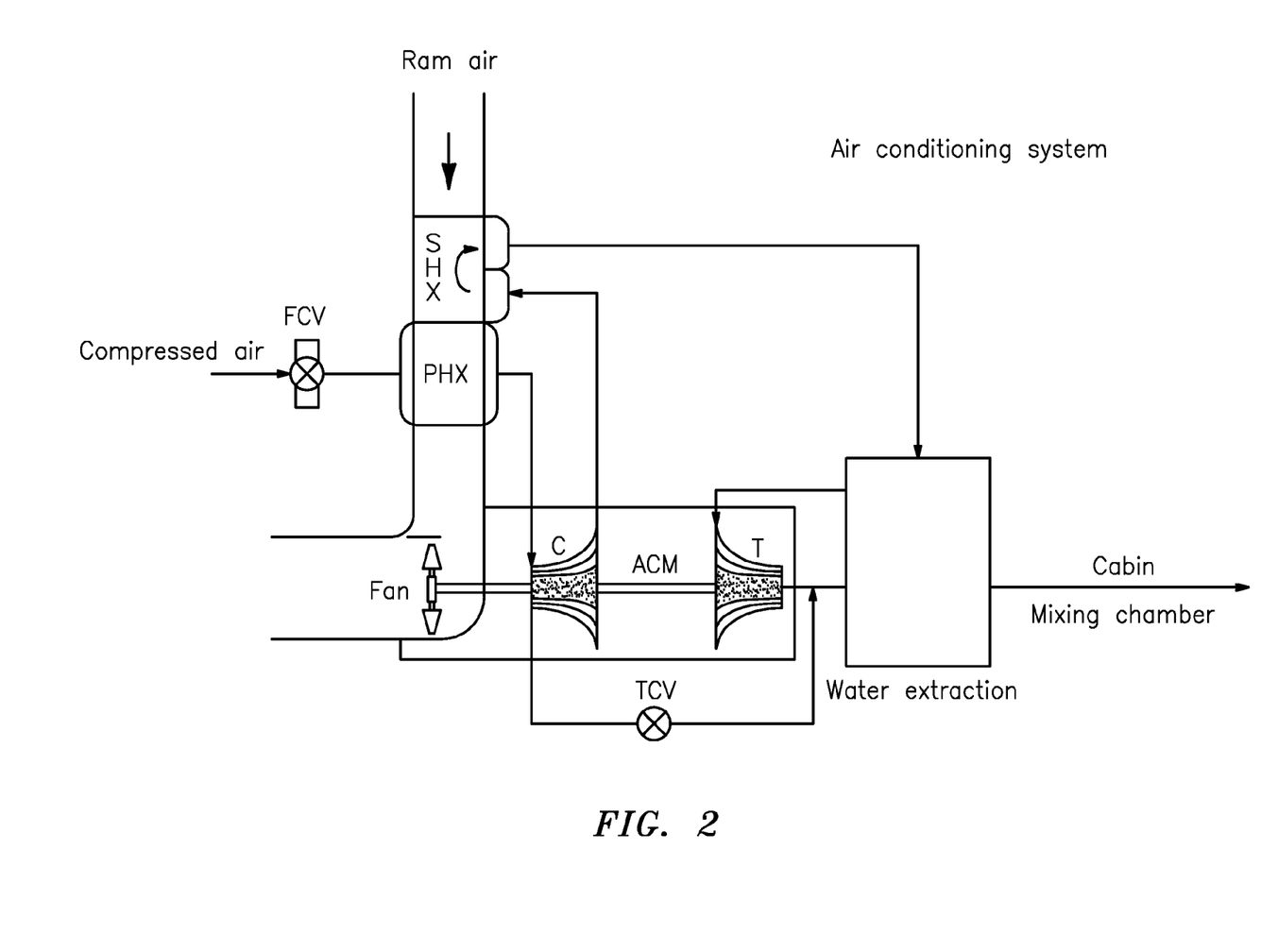
FIG. 2: architecture of an aircraft air conditioning system.

FIG. 2 shows the typical design of an aircraft air conditioning system.

Hot pressurized air from the engines or from an auxiliary unit is supplied to the flow control valve FCV of the air conditioning system (approximately 200° C. and 3 bar). This air is pre-cooled to approximately 100° C. in the pre-heat exchanger PHX and subsequently further compressed in a compressor C. A second cooling of the compressed air in the main heat exchanger SHX to approximately 40° C. then takes place with a subsequent dehumidification in a water extraction system. The dehumidified air is then expanded in the turbine T and cooled in this process to approximately −30° C. The shaft power arising at the turbine is used to drive the compressor and a fan to convey PHX/SHX ram air or ambient air. The air flows from the turbine outlet through the water extraction system and subsequently into a mixing chamber or into the cabin.

FIG. 2 shows the architecture of an aircraft air conditioning system only by way of example. Irrespective of the specific architecture, in an aircraft air conditioning system, one ram air passage is always present with at least one ram air heat exchanger installed there.

Embodiments are covered by the invention which have one (HX), two (PHX and SHX) or also more than two air conditioning system heat exchangers.

Figure 3:
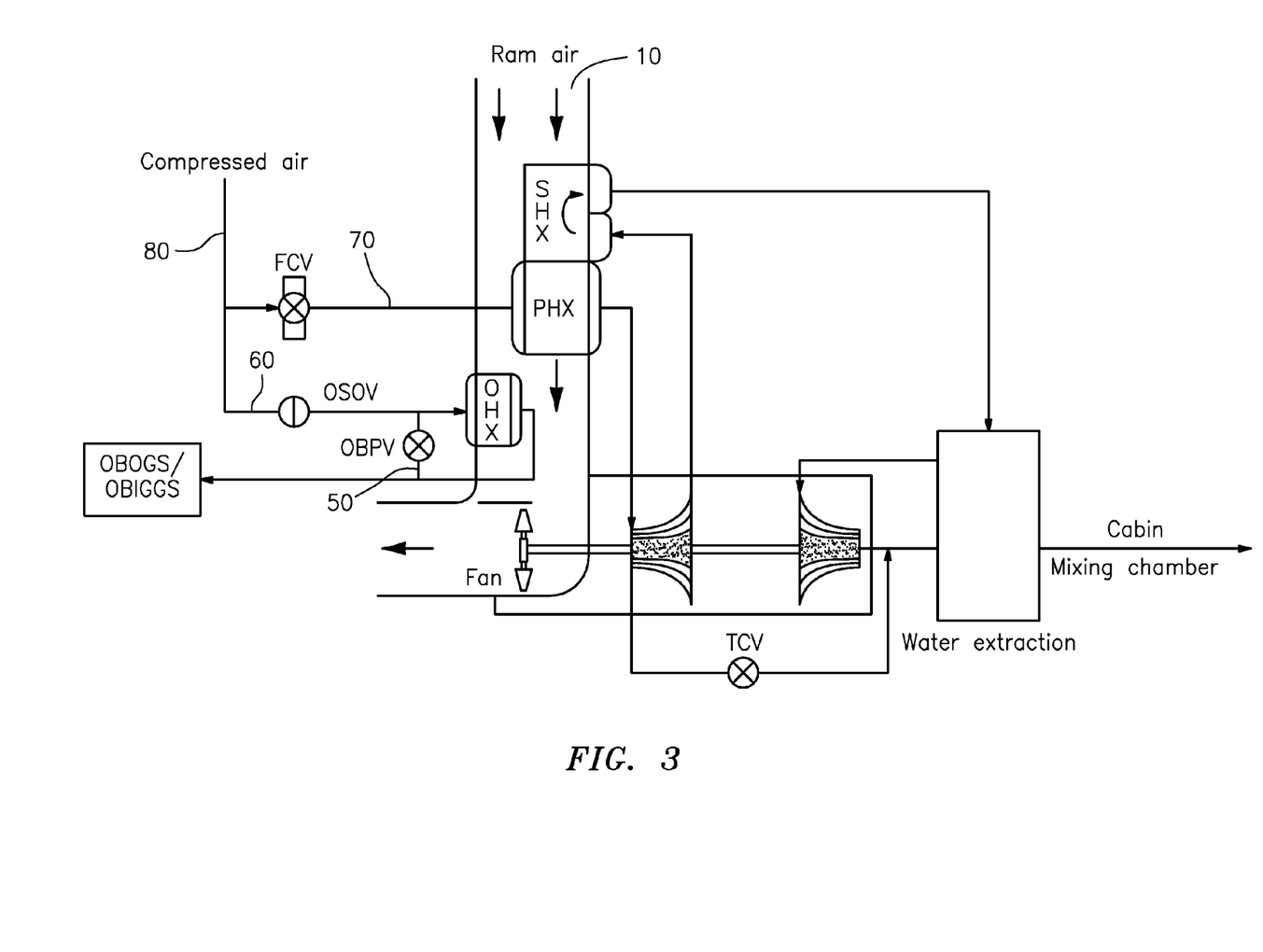
FIG. 3: ram air passage of the aircraft air conditioning system with integrated system heat exchanger OHX.
Figure 4:
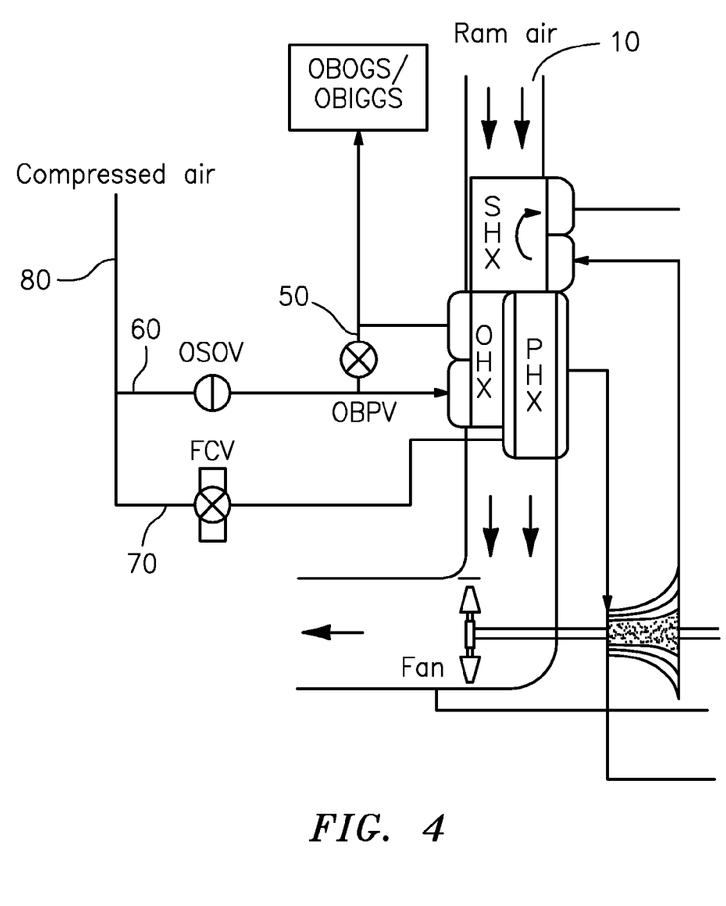
FIG. 4: arrangement of the system heat exchanger OHX in the ram air passage.
Figure 5:
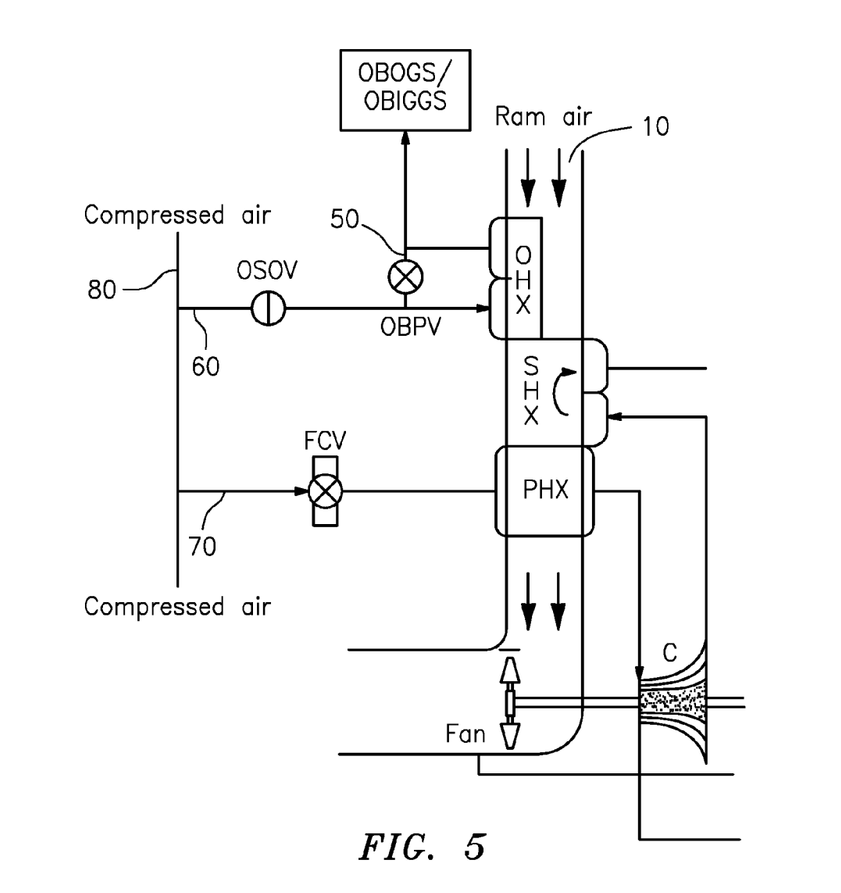
FIG. 5: arrangement of the system heat exchanger OHX in the ram air passage.

FIGS. 3 to 5 show embodiments of the invention which differ in the arrangement of the system heat exchanger OHX. The closable line in accordance with the invention between the outlet side of the system heat exchanger OHX on the compressed air side and the compressed air line system of the aircraft air conditioning system is not shown in these drawings. The line not shown extends in the embodiments of FIGS. 3 to 5 between the outlet of the system heat exchanger OHX on the compressed air side and that of the first heat exchanger PHX of the air conditioning system on the compressed air side.

FIG. 3 shows the integration of the system heat exchanger OHX in the common ram air passage in which the air conditioning system heat exchangers PHX and SHX are also located. The OHX is thus integrated into the ram air passage of the air conditioning system which is anyway present. The architecture of the compressed air cooling for the OBOGS/OBIGGS supply is unchanged and the same as already shown in FIG. 1. Compressed air of approximately 200° C. is supplied to the system heat exchanger OHX via the open valve OSOV. To cool the compressed air, ram air is utilized from the common ram air inlet passage of the air conditioning system and the system heat exchanger OHX. The inlet of the system heat exchanger OHX on the compressed air side is connected to the outlet of the compressed air side by means of the valve OBPV in the bypass line 50. The temperature of the OBOGS/OBIGGS supply air can be controlled by a corresponding opening of the OBPV.

As already mentioned, the substantial advantages of the integration of the system heat exchanger shown in FIG. 3 are the weight and space savings due to the omission of an OBOGS/OBIGGS ram air passage. A further advantage consists of the fact that the fan of the air cycle machine is arranged such that a ram air throughput or an environmental air throughput is generated not only for the air conditioning system heat exchangers PHX, SHX, but also for the system heat exchanger OHX. In the arrangement shown in FIGS. 4 and 5 of the system heat exchanger OHX with the air conditioning system heat exchangers in series, the advantage further results that the ram air supplied to the system heat exchanger OHX is not guided uselessly through the system heat exchanger OHX, but always flows through at least one of the air conditioning system heat exchangers.

As can further be seen from FIG. 3, the compressed air supply 60 leads to the inlet of the system heat exchanger OHX on the compressed air side and the compressed air supply 70 to the inlet of the primary heat exchanger PHX on the compressed air side, both compressed air lines branching off a common compressed air line 80.

The arrangement of the system heat exchanger OHX with respect to the ram air exchanger(s) PHX, SHX of the air conditioning system can differ in dependence on the conditions and demands.

The following cases are to be distinguished:

a) If a relatively low temperature is required for the OBOGS/OBIGGS air supply, an arrangement of the system heat exchanger OHX such as is shown in FIG. 3 and FIG. 5 is advantageous. In accordance with FIG. 3, the system heat exchanger OHX is arranged parallel to SHX and PHX on the ram air side. An arrangement results from FIG. 5 in which system heat exchanger OHX is arranged on the ram air side before the first heat exchanger of the air conditioning system (SHX) on the ram air side. In this process, the ram air at the inlet of the system heat exchanger OHX has the lowest possible temperature and thus generates the maximum cooling possible.

In the embodiment in accordance with FIG. 3, the system heat exchanger OHX is arranged with respect to the air conditioning system heat exchangers PHX and SHX such that the air entering into the system heat exchanger OHX is not pre-heated by SHX or PHX. The ram air of the lowest possible temperature flows both into the secondary heat exchanger SHX and into the system heat exchanger OHX.

In the embodiment in accordance with FIG. 5, the system heat exchanger OHX and the secondary heat exchanger are arranged at least partially in series. The system heat exchanger OHX covers a partial area of the secondary heat exchanger SHX on the ram air side such that this part of the secondary heat exchanger SHX is connected in series to the system heat exchanger OHX. The primary heat exchanger PHX is connected downstream of the secondary heat exchanger SHX on the ram air side.

b) Depending on the filter material and the OBOGS/OBIGGS demands, higher temperatures of the supply air can also be permitted. In particular OBIGGS units tend to permit a somewhat higher temperature of the supply air. It can be advantageous in this case to arrange the system heat exchanger OHX after the SHX on the ram air side. In this process, higher inlet temperatures at the OHX result on the ram air side which result in a somewhat higher outlet temperature on the compressed air side.

The advantage here is that the unit of SHX, PHX and OHX can be made more compact (see FIG. 4) and no ram air flows uselessly through the OHX when the OBOGS/OBIGGS is switched off. In the embodiment in accordance with FIG. 4, the ram air and/or environmental air first flows through the secondary heat exchanger and then through the system heat exchanger OHX and the primary heat exchanger PHX connected downstream and arranged in parallel to one another.

c) The OBOGS/OBIGGS operation can also only be necessary at times (in particular OBOGS is only required in very rare failure cases). If the air conditioning system still has capacity reserves under these special conditions or if a certain reduction in capacity of the air conditioning system is acceptable, the system heat exchanger OHX can also be arranged in a partial region in front of the first heat exchanger (SHX) of the air conditioning system on the ram air side (FIG. 5). Relatively low OBOGS/OBIGGS supply air temperatures can be achieved in this process. The smallest possible ram air passage and a compact heat exchanger arrangement is achieved with this version with respect to the installation options shown.

Figure 6:
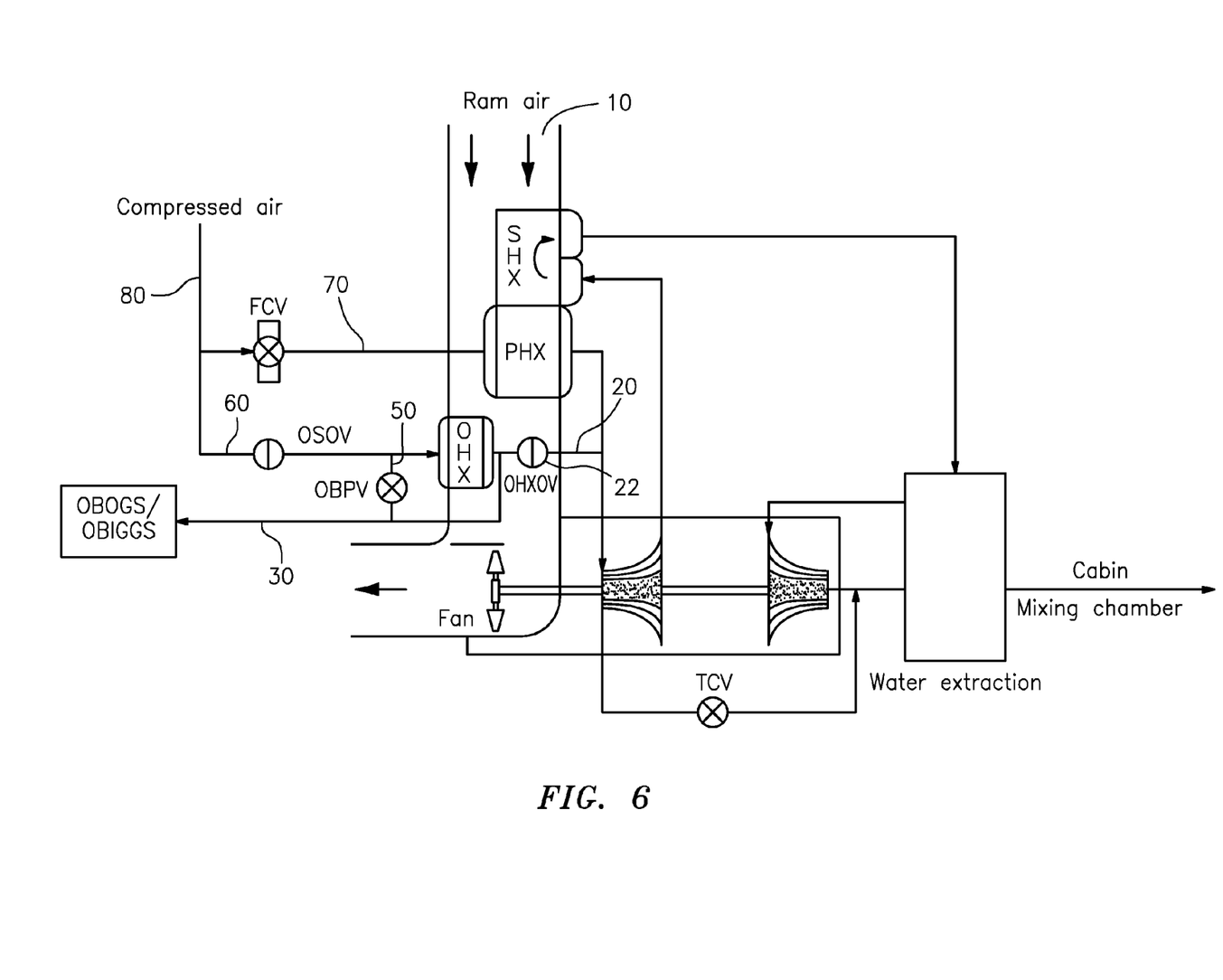
FIG. 6: system heat exchanger OHX with valve OHXOV in the communication line to the aircraft air conditioning system.

FIG. 6 shows the closable connection line 20 between the outlet side of the system heat exchanger OHX on the compressed air side and the outlet on the compressed air side of the first ram air heat exchanger of the air conditioning system (PHX here) on the compressed air side. The open/closed valve 22 by means of which the line can be opened or closed is arranged in the line. When OBOGS/OBIGGS is switched off (inlet valve at the OBIGGS/OBOGS closed—not shown here), the OHXSOV and OSOV are opened, whereby an additional heat transmitter can be utilized for the air conditioning system.

If the system heat exchanger OHX is also available for the air conditioning system in the case of maximum cooling, the ram air heat exchanger PHX, SHX of the air conditioning system can be reduced due to the additional heat transfer capacity with corresponding advantages with respect to weight and construction space.

With a closed OHXOV, the operating state corresponds to that shown in FIG. 3.

As can be seen from FIG. 6, a line 30, which leads to the system OBOGS/OBIGGS, branches off from the connection line 20 between the outlet of the system heat exchanger OHX on the compressed air side and the check valve 22.

The redundancy with respect to the OBOGS/OBIGGS supply is also increased by the OHXOV. If the OSOV should fail in the closed position, the system heat exchanger OHX can be supplied with compressed air from the outlet of the PHX on the compressed air side in that the OHXOV is opened. In an architecture without this connection (see FIG. 3), a closed OSOV results in the failure of the OBOGS/OBIGGS supply.

Due to the fact that the compressed air supply of the air conditioning system can now take place via two valves arranged in parallel (FCV and OSOV), a throughput measurement should also take place parallel to the FCV in the OSOV branch. This can take place by a corresponding design of the OSOV.

The connection via the OHXOV results in a further advantage.

In certain flight phases with a relatively low pressure level of the supply air and high fresh air requirements, it can be necessary to open the TCV of the air conditioning system at least partly. The turbine which acts as a restrictor can thereby be bypassed and thus the required transmission of the air conditioning system ensured. However, approximately 100° C. hot air is mixed with the cold turbine outlet air of approximately −30° C. by the opening of the TCV, whereby the cooling capacity is considerably reduced. In an arrangement as shown in FIG. 6 and with a switched off OBOGS/OBIGGS, much cooler air can be mixed into the TCV inlet (=PHX outlet on the compressed air side) via an open OHXOV. This positive effect is in particular of advantage with an open TCV and is, however, also present with a closed TCV (low compressor inlet temperature), albeit to a lower degree.

Figure 7:
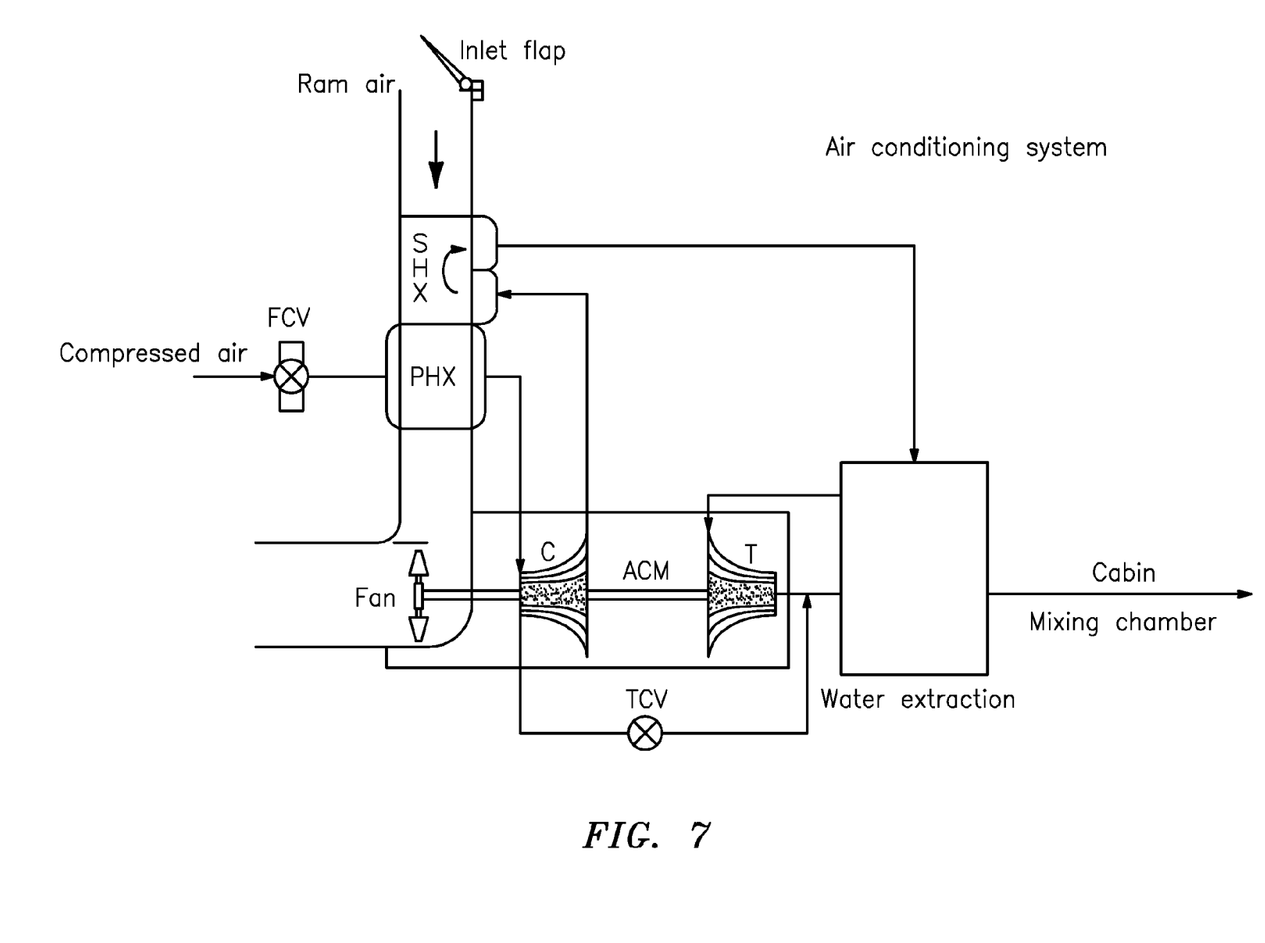
FIG. 7: air-conditioning system with ram air passage inlet flap.

The solution in accordance with the invention furthermore has the following advantages in heating operation:

The function of the air conditioning system includes cooling and heating. Heating is made possible in that the ACM (air cycle machine) (including cooling turbine) and the ram air heat exchanger SHX are at least partly bypassed by opening the TCV (FIG. 7). If the heating capacity achieved is not sufficient, an additional and controllable flap can also be present at the inlet of the ram air passage. By partly closing this flap, the ram air throughput, and thus the heat transfer of the ram air heat exchangers (here SHX and PHX), is reduced (see FIG. 7).

In this heating mode, the ACM, and thus the fan arranged in the ram air passage, also always runs at a specific minimum speed of rotation. It is necessary here for the fan to be able to convey a minimum throughput of ram air. Too low a ram air throughput results in surge operation (pumping, vibrating) which can result in the failure of the fan and thus of the ACM. For this reason, with known systems, the ram air inlet flap can also not be completely closed in the heating mode, whereby restrictions result with respect to the maximum heating capacity which can be achieved.

These disadvantages can be avoided by a corresponding design of the ram air passage in connection with the parallel arrangement of the system heat exchanger OHX (FIG. 8):

1) After the common ram air inlet opening 10, the ram air is directed separately via separate supplies 41, 42 to the system heat exchanger OHX and to the ram air heat exchanger (s) PHX, SHX of the air conditioning system. This is achieved by means of the partition wall 40 which extends in the ram air passage in its longitudinal direction and divides it into the two supplies 41, 42 extending up to the respective heat exchangers OHX, SHX. In accordance with FIG. 8, no partition wall is present on the ram air side downstream of the heat exchangers OHX, PHX so that a common flow through the ram air passage takes place in this region.

Figure 8:
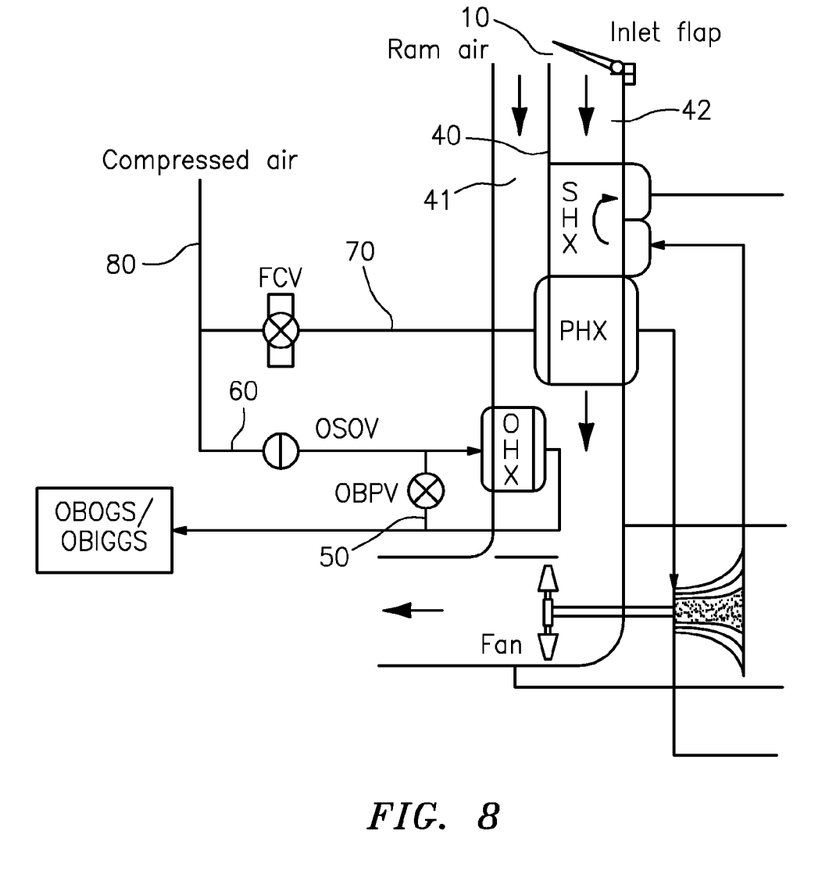
FIG. 8: separate ram air passage with ram air passage flap to close the supply of the air conditioning system heat exchanger.

2) The ram air inlet flap is made such that only the ram air inlet of the heat exchangers PHX, SHX of the air conditioning system is closed in the fully closed state, i.e. no ram air flows into the supply 42. The ram air inlet of the system heat exchanger OHX remains open so that ram air flows into it through the supply 41.

The required minimum throughput for the fan is thus ensured by the ram air of the system heat exchanger OHX. The ram air flap can thus be completely closed in the heating mode, whereby a substantially higher heating capacity of the air conditioning system results. The heat dissipated in the ram air heat exchanger OHX has no effect on the air conditioning system when the outlet of the system heat exchanger OHX on the compressed air side is separate from the air conditioning system. If a configuration is used as shown in FIG. 6, the OHXOV is closed in the heating mode.

Figure 9:
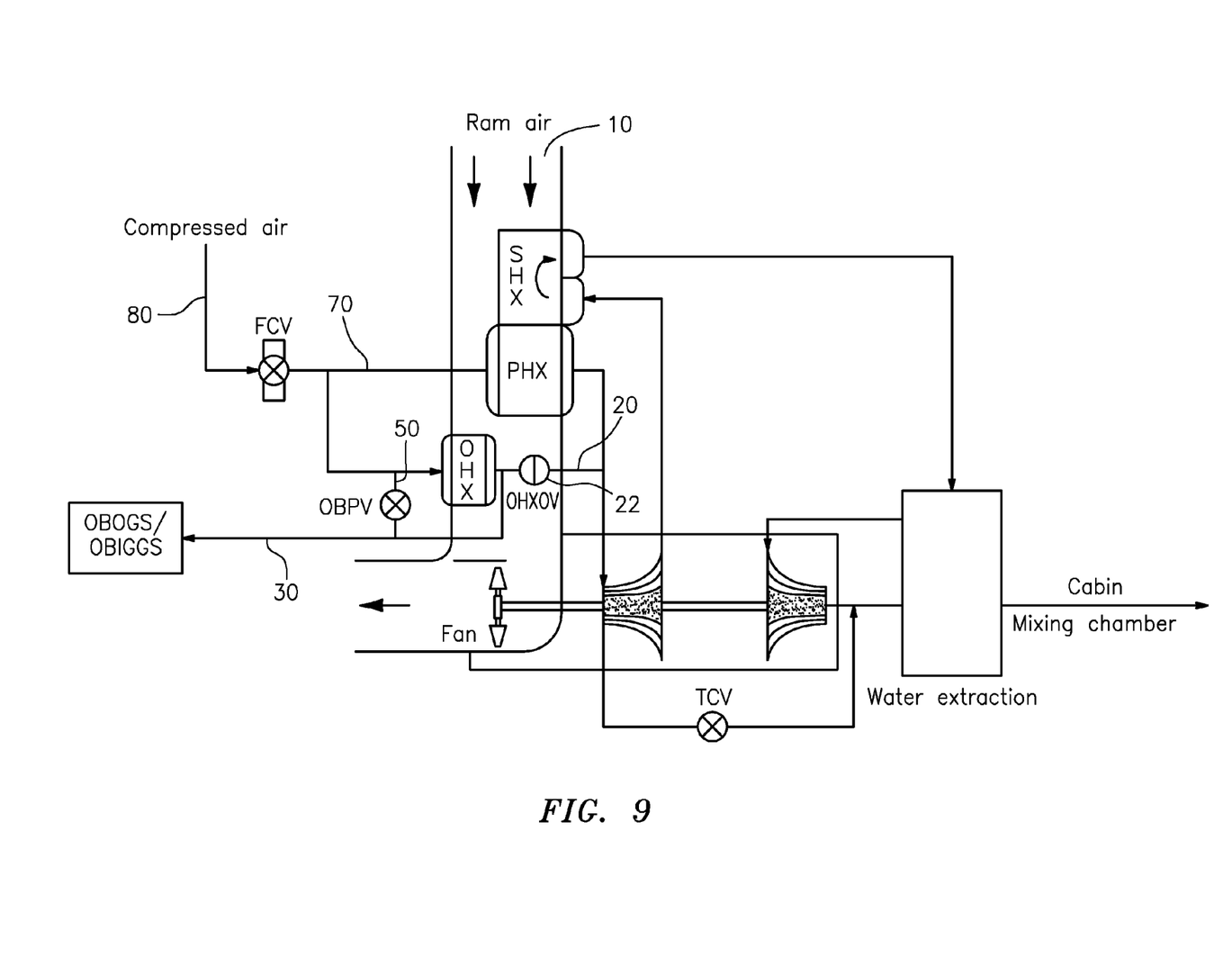
FIG. 9: architecture in accordance with FIG. 6 with system heat exchanger OHX supplied with compressed air via the FCV.

FIG. 9 shows a system for the preparation of compressed air in accordance with the invention which largely corresponds to the system explained with reference to FIG. 6 so that reference is accordingly made. One difference results in that the inlet of the system heat exchanger OHX on the compressed air side is connected to the outlet of the inlet valve FCV of the aircraft air conditioning system via a line. As can be seen from FIG. 9, this line branches off from the line 70 which extends between the outlet of the inlet valve FCV and the inlet on the compressed air side of the first air conditioning system heat exchanger PHX on the compressed air side.

In the embodiment in accordance with FIG. 9, differing from the embodiment in accordance with FIG. 6, no separate inlet valve OSOV is thus provided for the system heat exchanger OHX.

Figure 10:
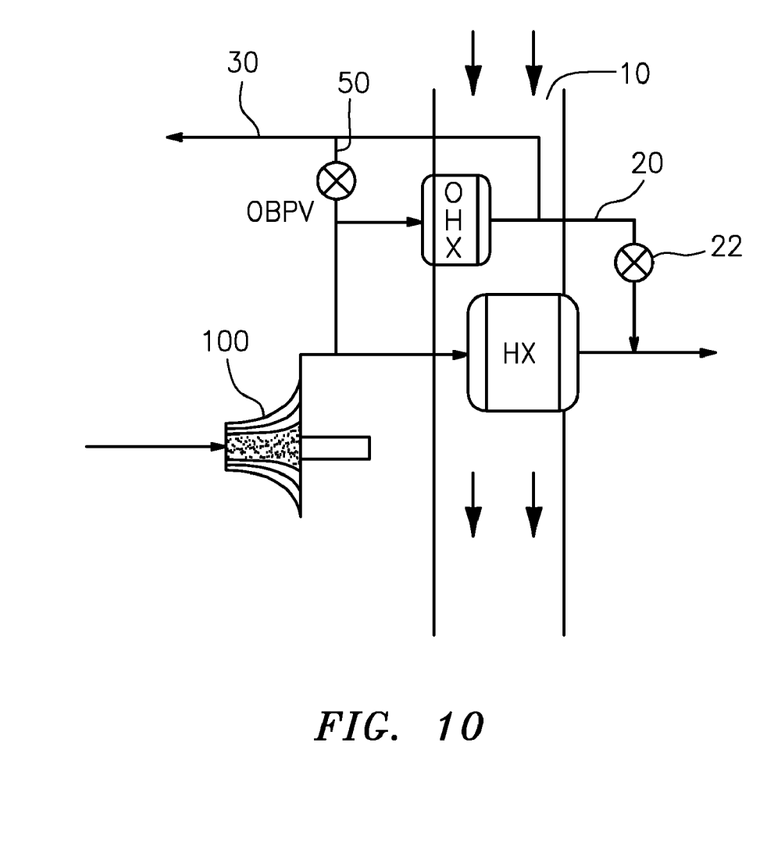
FIG. 10 a system for the preparation of compressed air with a compressor as the compressed air source.

FIG. 10 shows an embodiment of the invention in which the compressor 100 serves as the compressed air source.

It must generally be pointed out that, in accordance with the present invention, the compressed air source is not restricted to the engines or to an auxiliary unit, but includes any means of generating compressed air.

If a compressor is used, it can be connected before an aircraft air conditioning system or also be a component of the air conditioning system itself, for example a component of an ACM of the air conditioning system.

The compressor can be driven in any desired manner. A motor-driven compressor and/or a compressor which is seated on a common shaft with a turbine can be considered, for example.

The compressor can be designed with one or more stages.

The aforesaid embodiment possibilities for the compressed air source apply to the compressed air supply of the at least one air conditioning system heat exchanger and/or to that of the system heat exchanger.

As can further be seen from FIG. 10, and as stated above, embodiments are covered by the invention in which the air conditioning system only has one air conditioning system heat exchanger (HX).

As can be seen from FIG. 10, the compressor 100 is in communication on its pressure side with the inlet of the heat exchanger HX on the compressed air side which is arranged in the ram air passage. The system heat exchanger OHX, which is in communication with the pressure side of the compressor on its inlet side on the compressed air side, is furthermore located in the ram air passage. The outlet of the system heat exchanger OHX on the compressed air side is in communication with the outlet of the air conditioning system heat exchanger HX on the compressed air side via the connection line 20. The check valve 22 is located in the line 20. The line 30, which leads to the unit to be supplied with cooled compressed air, for example to the system OBOGS/OBIGGS, branches off between the outlet of the system heat exchanger OHX on the compressed air side and the check valve 22. The line 30 is in communication with the compressed air supply of the OHX via the bypass line 50 which can be closed by means of the valve OBPV.

After the cooling of the compressed air in the heat exchanger HX and optionally after the mixing in of air cooled in the system heat exchanger OHX by means of the line 20, the cooled compressed air is supplied to the components of the air conditioning system or of the aircraft cabin which go further or to a mixing chamber connected in front of this.

The invention claimed is:

1. A system for the preparation of compressed air onboard an aircraft, said system comprising
at least one compressed air source;
a system heat exchanger which is in communication with the at least one compressed air source on an inlet side thereof and which is also in communication, on an outlet side thereof, with a separate onboard gas generating system to be supplied with cooled compressed air which has passed through the system heat exchanger; and
at least one air conditioning system heat exchanger which is in communication with the at least one compressed air source on an inlet side thereof and which is in communication, on an outlet side thereof, with additional components of an aircraft air conditioning system to be supplied with cooled compressed air which has passed through the at least one air conditioning system heat exchanger,
wherein
the system heat exchanger and the at least one air conditioning system heat exchanger have a common inlet (10) for being supplied with ram air or environmental air; and
the system heat exchanger is connected on its outlet side which provides cooled compressed air which has passed through the system heat exchanger, via a closable line (20) to either a line in communication with the at least one air conditioning system heat exchanger or the at least one air conditioning system heat exchanger itself.

2. The system in accordance with claim 1, wherein the system heat exchanger is connected on its outlet side supplying cooled compressed air to the inlet of the at least one air conditioning system heat exchanger to be supplied with compressed air or to the outlet of the at least one air conditioning system heat exchanger supplying cooled compressed air via the closable line (20).

3. The system in accordance with claim 1, further comprising in the closable line (20) an open/close valve (22) or a valve by which different throughputs through the line can be set.

4. The system in accordance with claim 1, further comprising a valve (22) wherein the closable line (20) extends between the outlet of the system heat exchanger supplying cooled compressed air and the outlet of the at least one air conditioning system heat exchanger supplying cooled compressed air and wherein a line (30) branches off from this closable line (20) upstream of the valve (22) by which the closable line (20) can be closed, said branch line (30) leading to the separate onboard gas generating system to be supplied with cooled compressed air.

5. The system in accordance with claim 1, wherein a first air conditioning system heat exchanger and second air conditioning system heat exchanger downstream thereof to be supplied with compressed air are provided; and the system heat exchanger is connected on its outlet side for supplying cooled compressed air via the closable line (20) to the inlet to be supplied with compressed air or to the outlet supplying cooled compressed air of the first air conditioning system heat exchanger.

6. The system in accordance with claim 5, further comprising a valve (22) wherein the closable line (20) extends between the outlet of the system heat exchanger supplying cooled compressed air and the outlet of the first air conditioning system heat exchanger supplying cooled compressed air and a line (30) branches off from the closable line (20) upstream of the valve (22) by which the closable line (20) can be closed, said branch line (30) leading to the separate onboard gas generating system to be supplied with cooled compressed air.

7. The system in accordance with claim 1, further comprising a ram air line wherein the system heat exchanger is connected in parallel to the at least one air conditioning system heat exchanger on the ram air line.

8. The system in accordance with claim 1, further comprising a ram air line wherein the system heat exchanger is arranged upstream of a first of the at least one air conditioning system heat exchanger on the ram air line.

9. The system in accordance with claim 1, further comprising a ram air line wherein the system heat exchanger is arranged downstream of a first of the at least one air conditioning system heat exchanger on the ram air line.

10. The system in accordance with claim 1, further comprising a ram air line wherein said at least one air conditioning system heat exchanger includes two or more heat exchangers which are arranged sequentially on the ram air line; and
the system heat exchanger is arranged on the ram air line downstream of a first air conditioning system heat exchanger and in parallel to a second air conditioning system heat exchanger.

11. The system in accordance with claim 1, further comprising a ram air line wherein a partition wall (40) is provided in the ram air line such that the ram air supply for the system heat exchanger and the at least one air conditioning system heat exchanger takes place separately (41, 42); and wherein
an adjustable ram air inlet flap is provided which, in a closed state, only closes an infeed (42) to the at least one air conditioning system heat exchanger from the ram air line.

12. The system in accordance with claim 1, further including a closeable bypass line wherein the inlet of the system heat exchanger to be supplied with compressed air and outlet for supplying cooled compressed air which leads to the separate onboard gas generating system to be supplied with the cooled compressed air, are in communication with one another via the closable bypass line (50).

13. The system in accordance with claim 1, further including a compressed air bleed system wherein
a compressed air supply leading to the inlet of the system heat exchanger to be supplied with compressed air and a compressed air supply (60, 70) leading to the inlet of the air conditioning system heat exchanger(s) to be supplied with compressed air branch off from the compressed air bleed system.

14. The system in accordance with claim 1, further comprising a compressed air supply valve wherein the inlet of the system heat exchanger to be supplied with compressed air is connected to a compressed air supply via the valve.

15. The system in accordance with claim 14, further comprising an inlet valve in the aircraft air conditioning system, wherein the compressed air supply valve is connected in parallel to the inlet valve in the aircraft air conditioning system.

16. The system in accordance with claim 1, further comprising an inlet valve in the aircraft air conditioning system wherein the inlet of the system heat exchanger to be supplied with compressed air is connected to an outlet of the inlet valve in the aircraft air conditioning system.

17. The system in accordance with claim 1, wherein the separate onboard gas generating system with which the system heat exchanger is in communication to be supplied with cooled compressed air is an emergency oxygen supply system and/or a nitrogen generating system.

18. The system in accordance with claim 1, wherein the at least one compressed air source is at least a one-stage compressor.

19. The system in accordance with claim 18, wherein the compressor is a multi-stage compressor driven by a motor.

20. The system in accordance with claim 1, wherein both the system heat exchanger and the at least one air conditioning system heat exchanger are positioned in a common conduit for supplying with ram or environmental air and having a common outlet.

21. The system in accordance with claim 1, wherein both the system heat exchanger and the at least one air conditioning system heat exchanger share a common inlet line (80) for compressed air.

22. A method for the operation of a system for preparation of compressed air onboard an aircraft and having
a first system heat exchanger which is in communication with at least one compressed air source on an inlet side thereof and, on an outlet side thereof, with a separate onboard gas generating system to be supplied with cooled compressed air, and
at least one air conditioning system heat exchanger which is in communication with the at least one compressed air source on an inlet side thereof and, on an outlet side thereof, with additional components of an aircraft air conditioning system to be supplied with cooled compressed air which has passed through the at least one air conditioning system heat exchanger,
the method comprising the steps of,
in a first operating mode, supplying the compressed air after cooling in the system heat exchanger to the separate onboard gas generating system with which the system heat exchanger is in communication; and, in a second operating mode, supplying the compressed air after the cooling in the system heat exchanger to either a line in communication with the at least one air conditioning system heat exchanger or to the at least one air conditioning system heat exchanger itself.

23. The method in accordance with claim 22, wherein the compressed air in the second operating mode is supplied, after the cooling in the system heat exchanger, to the inlet of the at least one air conditioning system heat exchanger to be supplied with compressed air or to the outlet of the at least one air conditioning system heat exchanger supplying cooled compressed air.

24. The method in accordance with claim 22, wherein the system heat exchanger and the at least one air conditioning system heat exchanger are supplied with compressed air via a common compressed air line (80) from a compressed air bleed system.

25. The method in accordance with claim 22, wherein a valve is provided in an inlet line (60) to the system heat exchanger to be supplied with compressed air; and in the event this valve erroneously remains closed, the system heat exchanger is charged with compressed air which is taken upstream or downstream from the at least one air conditioning system heat exchanger or from the at least one air conditioning system heat exchanger itself.

26. The method in accordance with claim 22, wherein the system heat exchanger and the at least one air conditioning system heat exchanger are charged with ram or environmental air through a common inlet (10), but via separate supply ducts (41, 42), and wherein a ram air inlet flap is provided which, in a closed position, only closes the supply duct (42) of the air conditioning system heat exchangers on a ram air line, with the ram air inlet flap being closed in a heating operation so that the ram air or the environmental air only flows through the system heat exchanger in the heating operation.

* * * * *